United States Patent
Inamura

(10) Patent No.: US 9,576,604 B1
(45) Date of Patent: Feb. 21, 2017

(54) MAGNETIC DISK DEVICE AND WRITE CONTROL METHOD

(71) Applicant: Kabushiki Kaisha Toshiba, Minato-ku, Tokyo (JP)

(72) Inventor: Seiji Inamura, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/015,260

(22) Filed: Feb. 4, 2016

Related U.S. Application Data

(60) Provisional application No. 62/210,656, filed on Aug. 27, 2015.

(51) Int. Cl.
  *G11B 19/04* (2006.01)
  *G11B 5/596* (2006.01)
  *G11B 19/06* (2006.01)

(52) U.S. Cl.
  CPC ........ *G11B 19/045* (2013.01); *G11B 5/59627* (2013.01); *G11B 19/041* (2013.01); *G11B 19/06* (2013.01)

(58) Field of Classification Search
  CPC ... G11B 5/59627; G11B 19/04–19/041; G11B 19/045; G11B 19/06; G11B 2020/1869
  USPC ............. 360/31, 53, 55, 60, 69, 75
  See application file for complete search history.

(56) References Cited

U.S. PATENT DOCUMENTS

| | | | |
|---|---|---|---|
| 7,245,447 B2 | 7/2007 | Zaitsu | |
| 7,502,283 B2 | 3/2009 | Schmidt et al. | |
| 7,570,445 B2 * | 8/2009 | Alfred | G11B 19/045 360/31 |
| 7,859,784 B2 * | 12/2010 | Ogawa | G11B 19/045 360/77.02 |
| 8,174,780 B1 | 5/2012 | Tsai et al. | |
| 8,300,350 B2 * | 10/2012 | Kawabe | G11B 19/045 360/77.02 |
| 8,531,793 B2 * | 9/2013 | Bandic | G11B 5/09 360/31 |
| 8,587,889 B2 * | 11/2013 | Kawabe | G11B 5/59627 360/60 |
| 8,611,032 B2 * | 12/2013 | Champion | G11B 5/5582 360/77.08 |
| 8,736,994 B2 * | 5/2014 | Sugawara | G11B 5/012 360/31 |
| 8,755,142 B2 * | 6/2014 | Grobis | G11B 19/045 360/75 |
| 8,854,751 B2 * | 10/2014 | Rub | G11B 19/045 360/31 |
| 8,854,760 B1 * | 10/2014 | Lu | G11B 20/18 360/31 |
| 8,879,180 B2 * | 11/2014 | Deki | G11B 27/36 360/31 |

(Continued)

*Primary Examiner* — Wayne Young
*Assistant Examiner* — James L Habermehl
(74) *Attorney, Agent, or Firm* — White & Case LLP

(57) ABSTRACT

A magnetic disk device according to an embodiment includes a disk including a plurality of tracks, a head configured to write and read data to and from the disk, and a controller configured to control an off-track of the head, which occurs when data is written to one track included in the plurality of tracks, within an allowable range of an amount of the off-track, which is set based on a count value of at least another track other than the one track.

20 Claims, 6 Drawing Sheets

(56) References Cited

U.S. PATENT DOCUMENTS

| | | | | |
|---|---|---|---|---|
| 8,913,338 B1* | 12/2014 | Chahwan | ............ | G11B 19/045 360/60 |
| 8,947,818 B2* | 2/2015 | Nitta | .................... | G11B 19/044 360/60 |
| 8,964,322 B2* | 2/2015 | Jeong | ............... | G11B 20/10268 360/45 |
| 9,001,442 B2* | 4/2015 | Park | ....................... | G11B 27/36 360/75 |
| 9,087,551 B2* | 7/2015 | Kojima | ............ | G11B 20/10009 |
| 9,236,073 B1* | 1/2016 | Liu | .................... | G11B 5/59627 |
| 9,286,947 B1* | 3/2016 | Ghaly | .................... | G11B 27/36 |
| 9,293,153 B2* | 3/2016 | Kong | ............... | G11B 20/10009 |

* cited by examiner

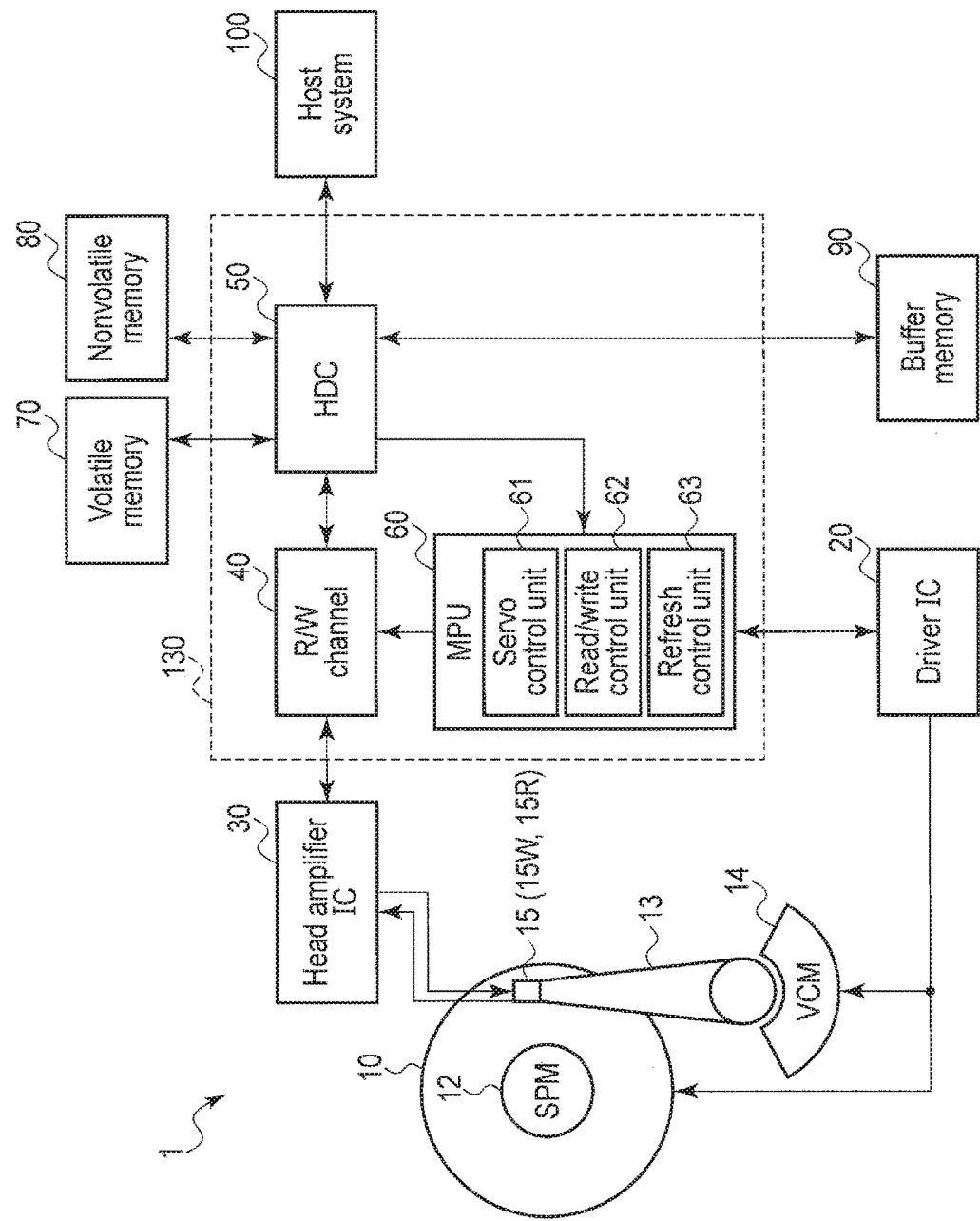
F I G. 1

T10

T11

| Track No. | Count value |
|---|---|
| Track 0 | 0 |
| Track 1 | 950 |
| Track 2 | 0 |
| Track 3 | 750 |
| Track 4 | 0 |
| ... | ... |

Outer ←----→ Inner

T13: Refresh threshold value : 1000

T15

| Off-track amount | Additional value |
|---|---|
| 0 ~ 10% | 1 |
| 11 ~ 15% | 10 |
| 16 ~ 20% | 100 |
| 21% ~ | 1000 |

T17: Refresh threshold value − Count value = Residual value

F I G. 3

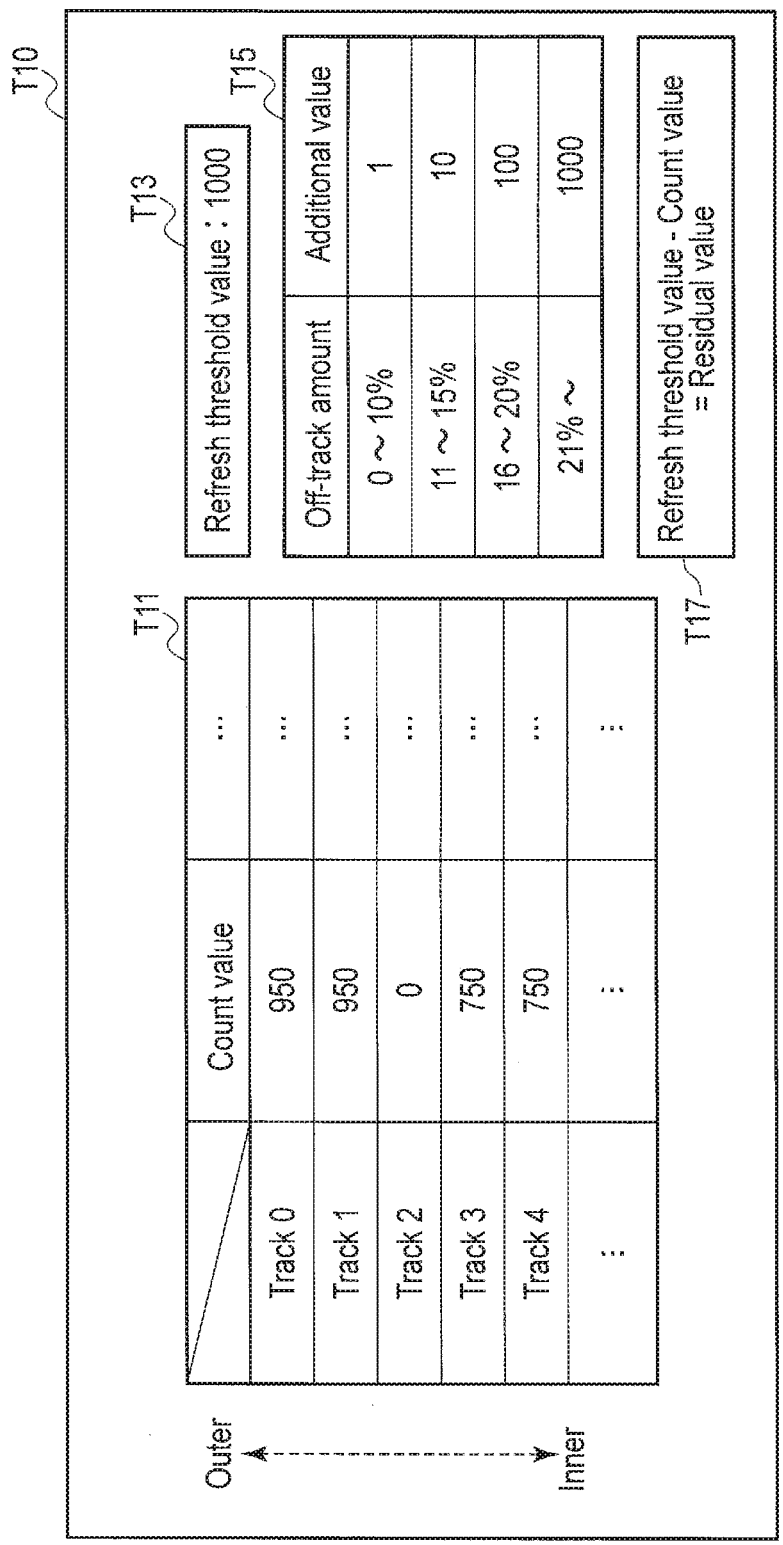
F I G. 5

MAGNETIC DISK DEVICE AND WRITE CONTROL METHOD

CROSS-REFERENCE TO RELATED APPLICATIONS

This application claims the benefit of U.S. Provisional Application No. 62/210,656, filed Aug. 27, 2015, the entire contents of which are incorporated herein by reference.

FIELD

Embodiments described herein relate generally to a magnetic disk device and a write control method.

BACKGROUND

Various technologies have recently been developed to increase memory capacity of a magnetic disk device (referred to as a hard disk drive (HDD) hereinafter) as one example of a recording device. In this magnetic disk device, when data is repeatedly written to a track targeted for writing data (referred to simply as a write target track hereinafter), a phenomenon occurs in which data of peripheral tracks of the write target track is erased or degraded under the influence of flux leakage of a head, such as a magnetic interference that is referred to as an adjacent track interference (ATI). To prevent this phenomenon, a data rewrite process (refresh process) is performed when the number of writes to a recording area (write number) exceeds a particular number. A threshold value of the write number counted until the refresh process is performed, may be determined in advance in a manufacturing step for each recording area.

Furthermore, an influence of data degradation upon an adjacent track in write operation varies with positioning accuracy of the head in write operation (off-track amount or offset amount), and an influence upon an adjacent track on the off-track side increases as the off-track amount becomes large. To prevent this, a process of inhibiting write when the off-track amount exceeds a particular amount in write operation is known.

BRIEF DESCRIPTION OF THE DRAWINGS

FIG. 1 is a block diagram showing a configuration of a magnetic disk device according to a first embodiment.

FIG. 3 is a diagram showing an example of a data group related to controlling write operation.

FIG. 5 is a diagram showing an example of a data group according to modification 1.

DETAILED DESCRIPTION

Figure 2:
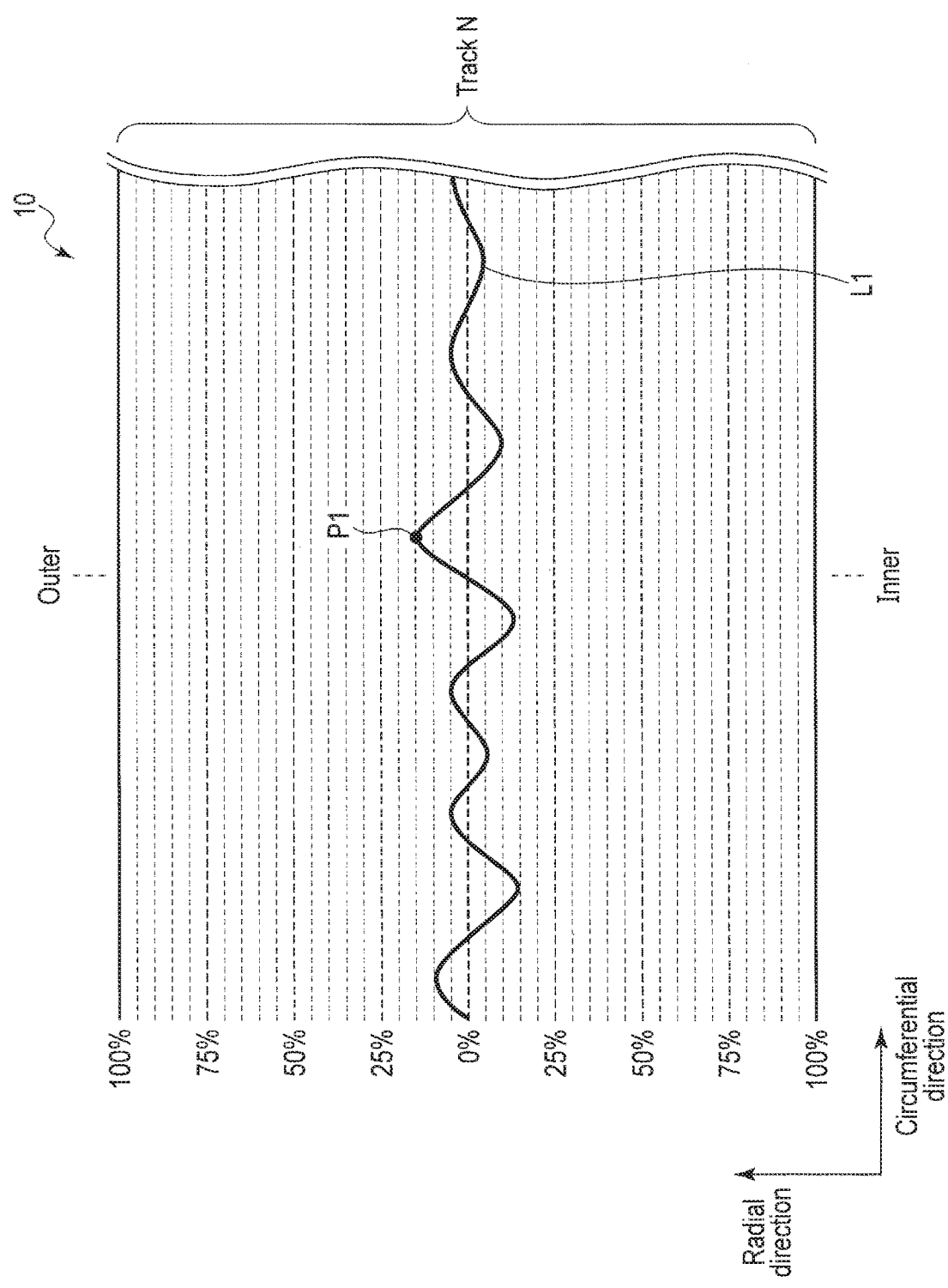
FIG. 2 is a conceptual diagram showing an example of an index of an off-track amount.

In general, according to one embodiment, a magnetic disk device comprises: a disk including a plurality of tracks; a head configured to write and read data to and from the disk; and a controller configured to control an off-track of the head, which occurs when data is written to one track included in the plurality of tracks, within an allowable range of an amount of the off-track, which is set based on a count value of at least another track other than the one track.

Various embodiments will be described hereinafter with reference to the accompanying drawings.

First Embodiment

FIG. 1 is a block diagram showing a configuration of a magnetic disk device 1 according to a first embodiment.

The magnetic disk device 1 includes head-disk assembly (HDA) described later, a driver IC 20, a head amplifier integrated circuit (referred to as a head amplifier IC hereinafter) 30, a volatile memory 70, a nonvolatile memory 80, a buffer memory (buffer) 90 and a system controller 130 composed of a one-chip integrated circuit. The magnetic disk device 1 is connected to a host system (host) 100.

The HDA includes a magnetic disk (referred to as a disk hereinafter) 10, a spindle motor (SPM) 12, an arm 13 with a head 15 and a voice coil motor (VCM) 14. The disk 10 is rotated by the spindle motor 12. The arm 13 and VCM 14 compose an actuator. By the VCM 14 is driven, the actuator controls movement of the head 15 of the arm 13 to a designated position on the disk 10. The number of disks 10 is one or more, as is the number of heads 15.

The head 15 includes a write head 15W and a read head 15R mounted on a slider serving as a main body. The read head 15R reads data out of a data track on the disk 10. The write head 15W writes data onto the disk 10.

The driver IC 20 controls driving of the SPM 12 and the VCM 14 in accordance with control of the system controller 130 (which will be described as an MPU 60 later).

The head amplifier IC 30 includes a read amplifier and a write driver. The read amplifier amplifies a read signal read out by the read head 15R and transmits the amplified signal to a read/write (R/W) channel 40. The write driver transmits write current which corresponds to write data output from the R/W channel 40, to the write head 15W.

The volatile memory 70 is a semiconductor memory of which data is lost when a power supply is shut off. The volatile memory 70 stores, for example, data necessary for processing in each unit of the magnetic disk device 1. The volatile memory 70 is, for example, a synchronous dynamic random access memory (SDRAM).

The nonvolatile memory 80 is a semiconductor memory that holds data even though a power supply is shut off. The nonvolatile memory 80 is, for example, a flash read only memory (FROM).

The buffer memory 90 is a semiconductor memory which temporarily holds, for example, data transmitted and received between the disk 10 and the host system 100. The buffer memory 90 may be disposed integrally with the volatile memory 70. The buffer memory 90 is a dynamic random access memory (DRAM), a static random access memory (SRAM), an SDRAM, a ferroelectric random access memory (FeRAM), a magnetoresistive random access memory (MRAM) and the like.

The system controller 130 is achieved using a large scale integrated circuit (LSI) called a system-on-a-chip (SoC) that is a single chip on which a plurality of elements are integrated. The system controller 130 includes the R/W channel 40, a hard disk controller (HDC) 50 and a microprocessor (MPU) 60.

The R/W channel 40 performs signal processing for read data and write data.

The HDC 50 controls data transfer between the host system 100 and the R/W channel 40 in accordance with an instruction from the MPU 60.

The MPU 60 is a main controller that controls each unit of the magnetic disk device 1. The MPU 60 controls the VCM 14 through the driver IC 20 and performs servo control to position the head 15. The MPU 60 controls a data read/write operation.

The MPU 60 includes a servo control unit 61, a read/write control unit 62 and a refresh control unit 63. The MPU 60 performs processings of these units on firmware.

The servo control unit 61 performs servo-control of the head 15. The servo control unit 61 also acquires positional information of the head 15 and manages position of the head 15 with respect to the disk 10. Under the management of the position of the head 15, the servo control unit 61 detects positioning accuracy (off-track amount or offset amount) of the head 15 with respect to a track targeted for write (referred to as a write target track or a target track hereinafter). From the result of this detection, the servo control unit 61 determines whether the off-track amount of the head 15 exceeds an allowable amount (allowable range) or not. The allowable amount means a range of off-track amount which does not exert such an influence as to require a refresh process, such as a magnetic influence, upon a track different from the write target track (referred to as a different track hereinafter).

The read/write control unit 62 controls data read/write in accordance with a command from the host 100. The read/write control unit 62 counts the number of writes to a specific track (correctly, count values based on the number of writes). When the head 15 writes data in an off-track state (referred to as off-track write hereinafter), the read/write control unit 62 adds to a count value a value (additional value) weighted according to an off-track amount representing the magnitude of the off-track. The read/write control unit 62 stops the write operation in accordance with a result of the determination of the servo control unit 61.

The refresh control unit 63 temporarily reads data out of a particular recording area of the disk 10 and controls a rewrite process (refresh process) for writing to the same recording area. For example, when the count value of a particular track exceeds a boundary value (refresh threshold value), the refresh control unit 63 performs a refresh process for the track. When the count value of a particular track approaches a refresh threshold value, the refresh control unit 63 is able to perform a refresh process for the track before the count value exceeds the refresh threshold value.

(Control Method of Write Operation)

A method of controlling a write operation will be described with reference to the drawings.

FIG. 2 is a conceptual diagram showing an example of an index of an off-track amount.

In FIG. 2, the vertical direction indicates the radial direction of the disk 10 and the horizontal direction indicates the circumferential direction of the disk 10. Furthermore, "Outer" represents a direction to the outer side in the radial direction of the disk 10 and "Inner" represents a direction to the inner side in the radial direction of the disk 10. Hereinafter, the outer side and the inner side in the radial direction of the disk 10 are referred to simply as the outer side and the inner side, respectively.

In FIG. 2, the index of 0% to 100% indicates an amount of swing of the head 15 which is based on the track center of a write target track (Track N), or an off-track amount of the head 15. For example, 0% of the off-track amount indicates that the head 15 is disposed on the track center of a write target track, or an on-track. 100% of the off-track amount indicates that the head 15 is disposed within the tracks adjacent to a write target track (referred to as adjacent tracks hereinafter). Solid line L1 indicates a locus of the head 15 (correctly, the write head 15). Point P1 indicates one point on solid line L1.

The MPU 60 divides the track width of a write target track (Track N) of the disk 10 into a plurality of sections, as shown in, for example, FIG. 2. The MPU 60 indicates the positions of the sections from the track center to the outermost and innermost track widths using the index of 0% to 100%. The MPU 60 (servo control unit 61) refers to positional information to determine whether the head 15 is positioned on the inner side or the outer side with reference to the track center and acquire an off-track amount of the head 15 with the index of 0% to 100%. In FIG. 2, for example, when the MPU 60 determines that the head 15 is positioned at point P1, it acquires the off-track amount as 15%.

FIG. 3 is a diagram showing an example of a data group T10 related to controlling write operation. As shown in FIG. 3, the data group T10 includes a first table T11, a refresh threshold value T13, a second table T15 and a calculus equation (calculus equation information) T17.

The first table T11 stores a count value of each track. In the first table T11, Tracks 0, 1, 2, 3 and 4 represent their respective particular tracks on the disk 10. The "Inner" and "Outer" close to the first Table T11 in FIG. 3 respectively correspond to the "Inner" and "Outer" shown in FIG. 2. As indicated by the arrow from the "Outer" to "Inner" in FIG. 3, the track numbers are shown in sequence from the outer side to the inner side, or from Track 0 to Track 4. The refresh threshold value T13 is a boundary value related to the refresh process. The second table T15 is a table showing a relationship between the off-track amount and the additional value. The off-track amount in the second table T15 corresponds to the index of 0% to 100% shown in FIG. 2. The off-track amount can be represented by another unit. The relationship between the off-track amount and the additional value is preset on the basis of, for example, a result of tests on an influence exerted on other tracks. The calculus equation T17 is a calculus equation for calculating a residual value of each of the tracks. The residual value represents a count value remaining until a count value reaches the refresh threshold value.

The MPU 60 holds the data group T10 in, for example, the volatile memory 70 in write operation. The MPU 60 writes the data group T10 to a system area or the nonvolatile memory 80 at given timing.

When the MPU 60 writes data to a write target track, it refers to the first table T11 to acquire a count value of each of the tracks. The MPU 60 calculates a residual value of each of the tracks using the count value, refresh threshold value T13 and calculus equation T17. The MPU 60 refers to the calculated residual value and the second table T15 to set an allowable value of the off-track. The MPU 60 controls a position of the head (off-track amount) on the basis of the set allowable value.

When the MPU 60 writes data to a write target track, it detects an off-track amount of the head 15. The MPU 60 refers to the second table 15 to acquire an additional value corresponding to the off-track amount. The MPU 60 adds the off-track amount to a particular track of the first table T11, such as a count value of an adjacent track.

When the off-track amount exceeds the allowable amount in write operation, or when a count value of a track of the other tracks exceeds the refresh threshold value, the MPU 60 stops the write to the write target track and performs a refresh process for the track whose count value exceeds the refresh threshold value. After the refresh process is completed, the MPU 60 resumes the write to the write target track.

For example, in write operation, the MPU 60 refers to the data group of FIG. 3 and calculates a residual value "50" from a difference between the refresh threshold value "1000" and the count value "950" of Track 1 adjacent to the outer side of Track 2. The MPU 60 compares the residual value "50" with the additional value of the second table T15 and sets the off-track amount "0% to 15%" corresponding to the additional values "1" and "10" which does not exceed the residual value "50" as an allowable value.

Similarly, the MPU 60 calculates a residual value "250" from a difference between the refresh threshold value "1000" and the count value "750" of Track 3 adjacent to the inner side of Track 2. The MPU 60 compares the residual value "250" with the additional value of the second table T15 and sets the off-track amount "0% to 20%" corresponding to the additional values "1," "10" and "100" which does not exceed the residual value "250" as an allowable value.

For example, when the MPU 60 writes data to Track 2, it detects off-track write of the head 15. When the MPU 60 detects the off-track write, it acquires an off-track amount from positional information of the head 15 within the range of Track 2. When the MPU 60 detects the off-track write, it determines whether the off-track direction of the head 15 is the outer side or the inner side with reference to Track 2. If the MPU 60 determines that the head 15 is off-tracked to the outer side, it refers to the second table T15 to acquire an additional value corresponding to the amount of off-track to the outer side. The MPU 60 adds the acquired additional value to the count value of Track 1 adjacent to the outer side of Track 2 in the first table T11.

For example, when the off-track amount is 10%, the MPU 60 adds additional value "1" to the count value "950" of Track 1. When the off-track amount is 16% to 20%, the MPU 60 adds additional value "100" to the count value "950" of Track 1. When the off-track is 0%, or when data is written in an on-track state (referred to as on-track write hereinafter), the MPU 60 may add additional value "1" to each of the count value "950" of Track 1 and the count value "750" of Track 3.

For example, when the off-track write is performed to the outer side of Track 2 in the off-track amount of 20%, the MPU 60 stops the write to Track 2 because the off-track amount "20%" exceeds the allowable amount "0% to 15%," and carries out a refresh process for Track 1 adjacent to the outer side of Track 2. When the MPU 60 completes the refresh process for Track 1, it updates the count value of Track 1 in the first table T11 to "0." After the MPU 60 updates the count value of Track 1 to "0," it resumes the write to Track 2.

Figure 4:
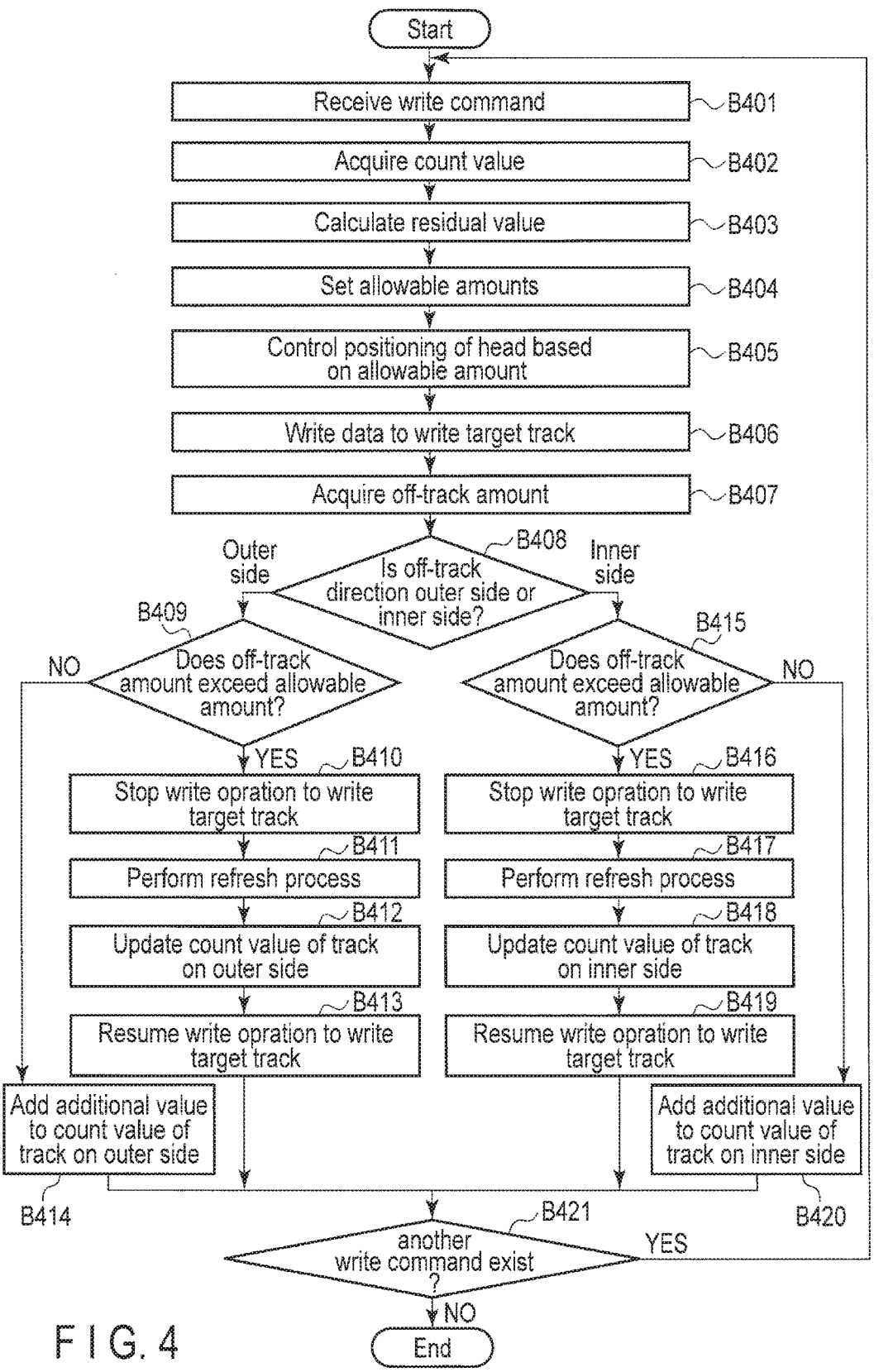
FIG. 4 is a flowchart of the controlling write operation method according to the first embodiment.

FIG. 4 is a flowchart of the controlling write operation method according to the first embodiment.

When the MPU 60 receives a write command from the host 100 (B401), it acquires count values of other tracks from the table in accordance with the write command (B402). For example, the MPU 60 acquires a count value of a track adjacent to either side of a write target track.

The MPU 60 calculates a residual value from a difference between the refresh threshold value and the count value of each of the other tracks (B403). For example, the MPU 60 calculates a residual value of a track adjacent to the outer side of the write target track and a residual value of a track adjacent to the inner side thereof from a difference between the refresh threshold value and the count value of a track adjacent to either side of the write target track.

The MPU 60 refers to the residual value of each of the other tracks and the second table T15 to set an allowable amount (B404). For example, the MPU 60 refers to the residual value of each of the tracks adjacent to the inner side and the outer side and the second table T15 to set an allowable amount of each of the tracks adjacent to the inner side and the outer side.

The MPU 60 controls the positioning of the head 15 on the basis of the allowable amounts (B405) and writes data to the write target track (B406).

Then, the MPU 60 acquires an off-track amount of the head 15 (B407). When the MPU 60 detects on-track write from the off-track amount, it determines the on-track write as off-track write whose off-track amount is 0%. The MPU 60 may refer to the second table T15 to add an additional value corresponding to the off-track amount of 0% to the count value of the track adjacent to each of the inner and outer sides.

When the MPU 60 detects the off-track write, it determines a direction in which the head 15 is off-tracked (B408). If the MPU 60 determines that the off-track direction is the outer side with reference to the track center (outer side in B408), it determines whether the off-track amount exceeds the allowable amount of off-track on the outer side of the write target track (B409). If the MPU 60 determines that the off-track amount exceeds the allowable amount of off-track on the inner side of the write target track (YES in B409), it stops the write operation to the write target track (B410) and performs a refresh process for the track on the outer side of the write target track (B411). For example, the MPU 60 performs a refresh process for one track adjacent to the outer side of the write target track.

The MPU 60 updates the count value of the track on the outer side in accordance with the refresh process (B412). For example, the MPU 60 updates the count value of a track adjacent to the outer side of the write target track to 0.

The MPU 60 resumes the write operation to the write target track (B413).

In B409, if the MPU 60 determines that the off-track amount of the head 15 does not exceed the allowable amount on the outer side (NO in B409), it adds an additional value corresponding to the amount of off-track from the track center to the outer side, to the count value of the track on the outer side (B414). For example, the MPU 60 adds an additional value corresponding to the amount of off-track from the track center to the outer side, to the count value of a track adjacent to the outer side.

In B408, if the MPU 60 determines that the off-track direction is the inner side with reference to the track center (inner side in B408), it determines whether the off-track amount exceeds the allowable amount of off-track on the inner side of the write target track (B415).

If the MPU 60 determines that the off-track amount exceeds the allowable amount of off-track on the inner side of the write target track (YES in B415), it stops the write operation to the write target track (B416) and performs a refresh process for the track on the inner side of the write target track (B417). For example, the MPU 60 performs a refresh process for one track adjacent to the inner side of the write target track.

The MPU 60 updates the count value of the track on the inner side in accordance with the refresh process (B418). For example, the MPU 60 updates the count value of a track adjacent to the inner side of the write target track to 0.

The MPU 60 resumes the write operation to the write target track (B419).

In B415, if the MPU 60 determines that the off-track amount of the head 15 does not exceed the allowable amount on the inner side (NO in B415), it adds an additional value corresponding to the amount of off-track from the track center to the inner side, to the count value of the track on the inner side (B420). For example, the MPU 60 adds an additional value corresponding to the amount of off-track from the track center to the inner side, to the count value of a track adjacent to the inner side.

The MPU 60 determines whether the host 100 transfers another write command (B421). If the MPU 60 determines that the host 100 transfers another write command (YES in B421), it returns to the process of B401. If the MPU 60 determines that the host 100 transfers no another write command (NO in B421), it completes the controlling write operation.

According to the first embodiment, the magnetic disk device 1 calculates a residual value remaining until a refresh process is required in a track adjacent to a write target track from a difference between a count value of the adjacent track and a refresh threshold value, and refers to the residual value and the second table T15 to set an allowable amount. When the offset amount of the head 15 exceeds the maximum allowable amount, the magnetic disk device 1 stops write to the write target track and performs a refresh process for the adjacent track. Thus, the magnetic disk device 1 is able to inhibit a write operation that exceeds a refresh threshold value greatly, with the result that the magnetic disk device 1 is able to protect data of the other tracks.

The following are two modifications to the magnetic disk device according to the first embodiment. In the modifications, the same elements as those of the first embodiment are denoted by the same reference numeral and their detailed descriptions are omitted.

(Modification 1)

A magnetic disk device 1 of modification 1 differs from that of the first embodiment in a method of counting a count value.

FIG. 5 is a diagram showing an example of a data group according to modification 1.

The MPU 60 counts count values of a plurality of tracks which are influenced by off-track write in a write target track, such as a plurality of tracks which are magnetically influenced.

In FIG. 5, the MPU 60 forms a given number of tracks as one group in another track and counts a count value of the one group.

For example, the MPU 60 forms two of a plurality of tracks on the outer and inner sides of a write target track as one group and counts a count value of the one group.

In FIG. 5, the MPU 60 selects Track 2 as a write target track. The MPU 60 forms Track 0 and Track 1 on the outer side of Track 2 as one group and counts count values of Track 0 and Track 1 as a count value of the one group. The MPU 60 also forms Track 3 and Track 4 on the inner side of Track 2 as one group and counts count values of Track 3 and Track 4 as a count value of the one group.

When a head 15 is off-tracked to the outer side with reference to the track center of Track 2, the MPU 60 adds the same additional value to the count values of Track 0 and Track 1. In FIG. 5, the same count value 950 is added. Similarly, when the head 15 is off-tracked to the inner side with reference to the track center of Track 2, the MPU 60 adds the same additional value to the count values of Track 3 and Track 4. In FIG. 5, the same count value 750 is added.

When the off-track amount exceeds the allowable amount of off-track on the outer side or the inner side, the MPU 60 stops write to Track 2 and performs a refresh process for Track 0 and Track 1 or Track 3 and Track 4. Completing the refresh process, the MPU 60 updates the count value of a first Table T11 to 0 and resumes the write to Track 2.

The MPU 60 may individually count the count values of a plurality of tracks on the outer and inner sides of the write target track. Then, the MPU 60 counts the count values according to an influence of off-track write. For example, the MPU 60 may count a count value of a track adjacent to the write target track (referred to as a first adjacent track hereinafter) and a count value of a track adjacent to the first adjacent track (referred to as a second adjacent track hereinafter) as different values. In this case, the count value of the first adjacent track can be set larger than that of the second adjacent track.

When the off-track amount exceeds the allowable amount of off-track on the outer side or the inner side, the MPU 60 stops write to Track 2 and performs a refresh process for Track 0, Track 1, Track 3 or Track 4. Completing the refresh process, the MPU 60 updates the count value of the first table T11 to 0 and resumes the write to Track 2.

According to modification 1, the magnetic disk device 1 is able to count values of a plurality of tracks that are influenced by off-track write in a write target track. Thus, the magnetic disk device 1 is able to inhibit a write operation on the basis of the count values of the tracks that are influenced by the off-track write in the write target track. Consequently, the magnetic disk device 1 is able to protect data of the tracks that are influenced by offset write in the write target track.

(Modification 2)

The magnetic disk device 1 according to modification 2 is able to perform a refresh process for a track other than a write target track before data is written to the write target track.

Figure 6:
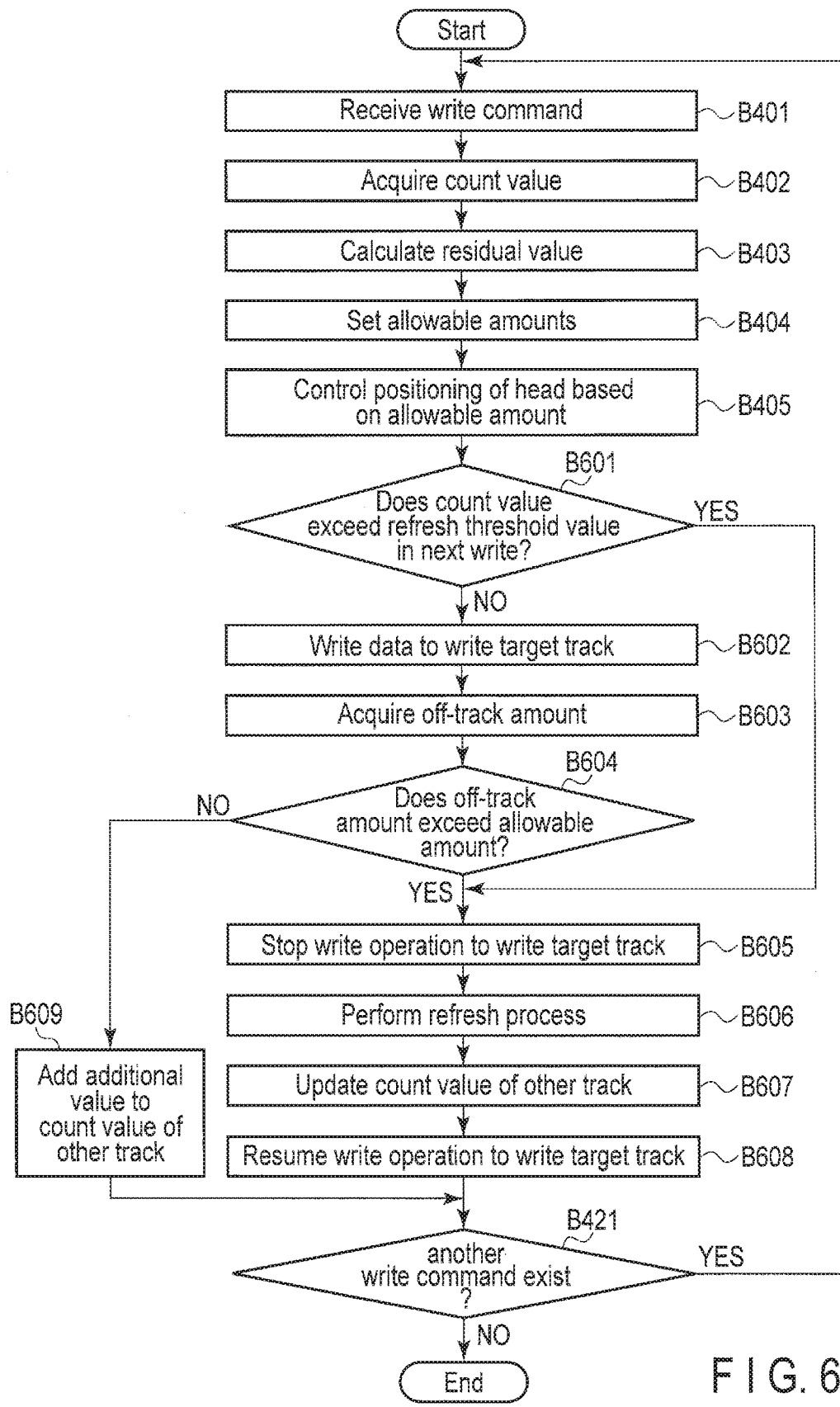
FIG. 6 is a flowchart of controlling write operation method according to modification 2.

FIG. 6 is a flowchart of a controlling write operation method according to modification 2. In the flowchart shown in FIG. 6, the same steps as those of the flowchart shown in FIG. 4 are denoted by the same reference numeral and their detailed descriptions are omitted.

Executing step B405, the MPU 60 determines whether the count value of each track exceeds a refresh threshold value in the next write (B601). For example, the MPU 60 determines whether the count value exceeds the refresh threshold value in the next write according to whether the count value reaches a particular count value. The MPU 60 may determine whether the count value exceeds the refresh threshold value according to a number of commands from the host 100.

When the MPU 60 determines that the count value of another track does not exceed the refresh threshold value in the next write (NO in B601), it writes data to the write target track (B602). When the MPU 60 determines that the count value of another track exceeds the refresh threshold value in the next write (YES in B601), it moves to B605 which will be described later. When the count value is, for example, 999, the MPU 60 determines that the count value exceeds the refresh threshold value "1000" in the next write. For example, when the MPU 60 receives commands the number of which exceeds the refresh threshold value when write is executed, from the host 100, it determines that the count value exceeds the refresh threshold value "1000" in the next write.

The MPU 60 acquires an off-track amount of the head 15 (B603). When the MPU 60 detects on-track write from the off-track amount, it determines the on-track write as off-track write whose off-track amount is 0%.

The MPU 60 determines whether the amount of off-track to the inner side or the outer side of the write target track exceeds the allowable amount (B604).

When the MPU 60 determines that the off-track amount exceeds the allowable amount on the inner or outer side of the write target track (YES in B604), it stops write operation to the write target track (B605).

The MPU 60 performs a refresh process for a particular one of the other tracks (B606). The particular one is a track that is determined as one exceeding the refresh threshold value in the next write in B601 or a track whose off-track amount exceeds the capacity on the inner or outer side of the write target track in B605.

The MPU 60 updates the count value of the track for which the refresh process is performed (B607). For example, the MPU 60 updates the track for which the refresh process is performed to 0.

The MPU 60 resumes the write operation to the write target track (B608).

When the MPU 60 determines in B604 that the off-track amount of the head 15 does not exceed the allowable amount (NO in B604), it adds an additional value corresponding to the off-track amount to the count value of another track (B609).

After the step of B608 or B609, the MPU 60 performs a given process and completes the controlling write operation.

According to modification 2, the magnetic disk device 1 is able to perform a refresh process before data is written to the write target track on the basis of the count value, or before the count value exceeds the refresh threshold value by writing data to the write target track. Consequently, the magnetic disk device 1 can reduce the influence of a track other than the write target track upon data due to off-track write in the write target track more than that in the foregoing embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk including a plurality of tracks;
a head configured to write and read data to and from the disk; and
a controller configured to control an off-track of the head, which occurs when data is written to one track included in the plurality of tracks, within an allowable range of an amount of the off-track, which is set based on a count value of at least another track other than the one track.

2. The magnetic disk device of claim 1, wherein:
the controller sets a first allowable range of an amount of an off-track to an inner side of the one track in a radial direction of the disk, based on a first count value of a first track of a plurality of tracks on the inner side of the one track;
sets a second allowable range of an amount of an off-track to an outer side of the one track in the radial direction of the disk, based on a second count value of a second track of a plurality of tracks on the outer side of the one track; and
controls an off-track to the inner side from a center of the one track within the first allowable range and an off-track to the outer side from the center of the one track within the second allowable range.

3. The magnetic disk device of claim 2, wherein the first track is a track adjacent to the inner side of the one track and the second track is a track adjacent to the outer side of the one track.

4. The magnetic disk device of claim 3, wherein:
the controller stops write to the one track if the amount of the off-track exceeds the first allowable range or the second allowable range;
reads first data from the first track or reads second data from the second track, and performs a rewrite process of writing the read first data to the first track or writing the read second data to the second track; and
resumes the write to the one track.

5. The magnetic disk device of claim 4, wherein:
the controller calculates a first differential value representing a difference between a threshold value for performing the rewrite process and the first count value and a second differential value representing a difference between the threshold value and the second count value, based on the first count value, the second count value, and the threshold value; and
sets the first allowable range and the second allowable range based on the first differential value, the second differential value, and a table representing relation of an additional value to the count value and the amount of the off-track.

6. The magnetic disk device of claim 5, wherein the controller performs the rewrite process for the first track or the second track before the first count value of the first track or the second count value of the second track exceeds the threshold value.

7. The magnetic disk device of claim 1, wherein:
the controller sets a first allowable range of an amount of an off-track to an inner side of the one track in a radial direction of the disk, based on first count values of first tracks of a plurality of tracks on the inner side of the one track;
sets a second allowable range of an amount of an off-track to an outer side of the one track in the radial direction of the disk, based on second count values of second tracks of a plurality of tracks on the outer side of the one track; and
controls an off-track to the inner side from a center of the one track within the first allowable range and an off-track to the outer side from the center of the one track within the second allowable range.

8. The magnetic disk device of claim 1, wherein:
the controller stops write to the one track if the amount of the off-track exceeds the allowable range;
reads data from the at least another track and performs a rewrite process of writing the read data to the at least another track; and
resumes the write to the one track.

9. The magnetic disk device of claim 8, wherein:
the controller calculates a differential value representing a difference between a threshold value for performing the rewrite process and the count value of the at least another track, based on the threshold value and the count value; and sets the allowable range based on the differential value and a table representing relation of an additional value to the count value and the amount of the off-track.

10. The magnetic disk device of claim 9, wherein the controller performs the rewrite process for the at least another track before the count value of the at least another track exceeds the threshold value.

11. A write control method of a magnetic disk device comprising a disk including a plurality of tracks and a head configured to write and read data to and from the disk, the method comprising:

controlling an off-track of the head, which occurs when data is written to one track included in the plurality of tracks, within an allowable range of an amount of the off-track, which is set based on a count value of at least another track other than the one track.

12. The write control method of claim 11, further comprising:

setting a first allowable range of an amount of an off-track to an inner side of the one track in a radial direction of the disk, based on a first count value of a first track of a plurality of tracks on the inner side of the one track;

setting a second allowable range of an amount of an off-track to an outer side of the one track in the radial direction of the disk, based on a second count value of a second track of a plurality of tracks on the outer side of the one track;

controlling an off-track to the inner side from a center of the one track within the first allowable range; and controlling an off-track to the outer side from the center of the one track within the second allowable range.

13. The write control method of claim 12, wherein the first track is a track adjacent to the inner side of the one track and the second track is a track adjacent to the outer side of the one track.

14. The write control method of claim 13, further comprising:

stopping write to the one track if the amount of the off-track exceeds the first allowable range or the second allowable range;

reading first data from the first track or reading second data from the second track, and performing a rewrite process of writing the read first data to the first track or writing the read second data to the second track; and resuming the write to the one track.

15. The write control method of claim 14, further comprising:

calculating a first differential value representing a difference between a threshold value for performing the rewrite process and the first count value and a second differential value representing a difference between the threshold value and the second count value, based on the first count value, the second count value, and the threshold value; and setting the first allowable range and the second allowable range based on the first differential value, the second differential value, and a table representing relation of an additional value to the count value and the amount of the off-track.

16. The write control method of claim 15, further comprising:

performing the rewrite process for the first track or the second track before the first count value of the first track or the second count value of the second track exceeds the threshold value.

17. The write control method of claim 11, further comprising:

setting a first allowable range of an amount of an off-track to an inner side of the one track in a radial direction of the disk, based on first count values of first tracks of a plurality of tracks on the inner side of the one track;

setting a second allowable range of an amount of an off-track to an outer side of the one track in the radial direction of the disk, based on second count values of second tracks of a plurality of tracks on the outer side of the one track; and controlling an off-track to the inner side from a center of the one track within the first allowable range and an off-track to the outer side from the center of the one track within the second allowable range.

18. The write control method of claim 11, further comprising:

stoppings write to the one track if the amount of the off-track exceeds the allowable range;

reading data from the at least another track and performing a rewrite process of writing the read data to the at least another track; and resuming the write to the one track.

19. The write control method of claim 18, further comprising:

calculating a differential value representing a difference between a threshold value for performing the rewrite process and the count value of the at least another track, based on the threshold value and the count value; and setting the allowable range based on the differential value and a table representing relation of an additional value to the count value and the amount of the off-track.

20. The write control method of claim 19, further comprising:

performing the rewrite process for the at least another track before the count value of the at least another track exceeds the threshold value.

* * * * *